October 15, 1913.

DRAWING 9,249

A careful search has been made this day for the original drawing or a photolithographic copy of the same, for the purpose of reproducing the said drawing to form a part of this book, but at this time nothing can be found from which a reproduction can be made.

Finis D. Morris,
Chief of Division E.

UNITED STATES PATENT OFFICE.

CARL HINRICHS, OF NEW YORK, N. Y.

IMPROVEMENT IN THE MANUFACTURE OF SULPHURIC ACID.

Specification forming part of Letters Patent No. 9,249, dated September 7, 1852.

*To all whom it may concern:*

Be it known that I, CARL HINRICHS, of New York city, and county and State of New York, have invented a new Method of Fabricating and Concentrating Sulphuric Acid, of which the following is a full and exact description.

Concentrated sulphuric acid marking 66° by Baumé's areometer consists of sulphur, one equivalent, S; oxygen, three equivalents, $O_3$; water, one equivalent, HO. Within the last century this acid has been made on a large scale in leaden chambers, where the gases resulting from the combustion of sulphur mixed with azotate or nitrate of potash, azotic or nitric acid, and the vapor of water give rise to the formation of the sulphuric acid in the leaden chambers.

First. The burning sulphur combines with two equivalents of oxygen and forms sulphurous acid, $SO_2$.

Second. Burning azotate or nitrate of potash furnishes deutoxide of azote, which, in contact with the air, passes immediately into a state of hypoazotic or hyponitric acid, $AZO_4$.

Third. Hypoazotic acid, coming in contact with the vapor of water, is immediately converted into azotic or nitric acid, $AZO_5$.

Fourth. The azotic acid containing five equivalents of oxygen gives one equivalent to the sulphurous acid, which becomes thus transformed into sulphuric acid, $SO_3$.

Fifth. At last there remains hypoazotic acid, which forms again azotic acid, recommencing always the same reactions as long as the aforesaid productions of gas are allowed to enter the chamber.

After having formed sulphuric acid, which remains liquid in the chambers, a considerable part of gases having escaped in the complex decompositions which take place in the interior, loose themselves in the exterior and spread in the neighborhood of every factory vapors injurious to animal life and detrimental to all vegetation. These vapors are hypoazotic acid, protoxide of azote, liberated azote, sulphurous acid, chlorine arising from impure nitrates of azotates, sulphuric acid, which passes off by the current of air and the vapors of water, &c.

To prevent the sensible loss of hypoazotic acid there is used in many factories an invention of Gay Lussac, which consists in passing the gas which leaves the leaden chamber through coke moistened with sulphuric acid, which absorbs only the hypoazotic gas and disengages the other productions of gas in the atmosphere. This sulphuric acid, charged with hypoazotic acid, is again introduced, with the products of the combustions of sulphur, into the chambers. It proves an economical employment of the azotates which are mixed with the sulphur; but to carry out the designs of my invention in the fabrication of sulphuric acid I have to use a condensing apparatus, which also prevents the noxious gases from doing injury to the neighborhood, which is always objectionable to the neighborhood. It is composed of a long leaden pipe, (at least eighty feet long and one foot diameter,) equal in diameter to that by which the products of the combustion of the sulphur-oven are introduced into the chamber. This pipe is placed horizontally outside of the last chamber, where it receives the escaping gases. The extreme end of it is shown at A, Figure 1, where, at the extremity, the pipe inclines at B to communicate with a reservoir, E, lined with lead containing a liquid put in motion by an agitator, F, to facilitate the absorption of the gases which must traverse the agitated liquid before entering the pipe G, that conducts them to the chimney of the establishment. This is an explanation of the operation of the apparatus. The products of gas, warm and humid, leaving the last chamber begin to condense in the horizontal lead pipe A, Fig. 1, where the sulphuric acid deposits throughout its length, presenting a continuous surface moistened with sulphuric acid which retains the hypoazotic or hyponitrous acid. This sulphuric acid, charged with hypoazotic in the horizontal pipe A, Fig. 1, descends into the inclined part B and drops constantly from the serpentine tube C, Fig. 1, into the receptacle D, Fig. 1. All other of the aforesaid gases pass into the reservoir E, where they are condensed and absorbed by milk of lime, which forms multiplied cascades round an agitator put in motion at F by a machine or by manual power. After traversing this liquid, the last particles which are carried by the currrent into the tube G, and so into the chimney, consist of nothing more than an aeriform production composed of azote and oxygens of no value to the fabrication, and are without smell and not injurious to the vicinity. The obturator H serves to regulate the draft during the operation. The collected acid in the receptacle D is employed for the decomposition of the azotates in the sulphur-oven, as I shall show afterward.

To prevent the presence of an excess of azotic acid in the chambers, which is always more or less injurious to the lead, I avoid carefully the introduction of said liquid in the chambers, because the atmospheric air which continually enters through the doors of the sulphur-oven for the formation of the sulphuric acid furnishes three-fourths of the oxygen necessary. I obtain a satisfactory result in decomposing one-tenth (of the quantity of burning sulphur) of nitrate of potash or of soda by the sulphuric acid charged with hyponitrous-acid gas provided by the receptacle D of the condensing apparatus. The decomposition takes place in iron pans placed in the oven above the sulphur, of which the combustion furnishes the necessary caloric. Sulphuric acid obtained by this mode of fabrication is purer than that generally produced. When it marks in the chamber 50° Baumé, it forms sulphuric acid one equivalent equal to 66.5; water in excess, 33.5. I let it run in the evaporating-kettle common to all factories, to separate from it a great part of its water, until the concentration reaches 60° Baumé, viz: sulphuric acid, one equivalent, eighty-five; water in excess, fifteen. Then I introduce it into the leaden apparatus which I have invented to replace the apparatus of platina, of which I give below the explanation.

A platina apparatus serves only to extract the fifteen one-hundredths of the excess of water which the acid of 60° contains. A complete apparatus of platina, large enough to contain about three hundred and fifty pounds of acid, weighs from one hundred and eighty to two hundred pounds, costs one hundred thousand francs. Each operation lasts one hour, which gives in ten hours a total of three thousand five hundred pounds concentrated acid to one equivalent of water at 66° Baumé. The apparatus has often to undergo expensive repairs, caused by the high temperature of boiling acid, (325° centigrade or 617° Fahrenheit,) also from the fact that the acid coming from the lead basin marking 60° moderates the temperature, and thereby contracts more or less the metal, so that after a certain number of operations the apparatus is liable to crack. The interest of the cost and the wear and tear may be calculated at five dollars per day.

My concentrating apparatus is composed of a leaden kettle, Fig. 2, A, twelve feet long, six feet width, one foot high, and one-fourth of an inch in thickness, covered with a leaden chapiteau, B, the tubes of which, C C C, communicate with a refrigerator or condenser destined to receive the weak acid which evaporates with the water. This kettle is placed on a brick oven and sustained by large plates of cast-iron common to all establishments of this kind. The process of concentrating the acid is thus explained: Fill the kettle A with the evaporated acid of 60° by the tube D. When it is full enough, which can be ascertained through the opening E, light the fire and keep it lively to bring the acid near to the boiling-point. The fire must be carefully kept at this heat without producing boiling from ten to twelve hours, which are sufficient for the operation. This can be easily observed through the opening E, which also serves to ascertain the degree of the acid. You thus obtain five thousand pounds sulphuric acid of 66° Baumé. By aid of a siphon it is made to run in a reservoir, where it cools and deposits whatever may solidify before being filled in the carboys. The operation can be recommenced or the apparatus allowed to cool without fear of accident. Till now sulphuric acid has never been concentrated to 66° Baumé without being made to boil, and this is why lead could not be used, as it melts at 322° centigrade or 612° Fahrenheit, while boiling acid stands 325° centigrade or 617° Fahrenheit. Another cause of the impracticability of concentrating on lead is the presence of azotic acid, and even chlorine, which the azotic acid proceeding from an impure niter containing hydrochlorates introduced into the sulphuric acid. In this case even platina is attacked.

The acid which I obtain with care and the apparatus thus described is as pure as it is possible to obtain, and does not injure the lead of the kettle in which it is concentrated.

It is easy to understand that the acid of 60° Baumé abandons without boiling the fifteen one-hundredths parts of water in excess at the high temperature, which augments without ceasing just at the boiling-point of the concentrated acid, because this water does not form with the acid a stable composition, while arrived at 66° the acid contains one equivalent of water. Its composition is very stable. It boils at 325° centigrade or 617° Fahrenheit, and distills without alteration. This is the concentrated sulphuric acid used in commerce, and composed, as said at the commencement of this specification, of sulphur, one equivalent, S; oxygen, three equivalents, $O_3$; water, one equivalent, HO.

What I claim as my invention, and desire to secure by Letters Patent, is—

1. Concentrating sulphuric acid in leaden vessels to the strength of 66° Baumé, and at a temperature below the boiling-point of the acid.

2. The long conducting and escape pipe, in combination with the agitating apparatus for condensing the deleterious gases and preserving a pure and wholesome air in the neighborhood of the establishment.

CARL HINRICHS.

Witnesses:
J. W. HERBST,
SYLVANUS MAYO.